July 12, 1960

L. R. HETZLER 2,945,174

TRANSISTOR REGULATOR

Filed Jan. 6, 1958

INVENTOR.
Lewis R. Hetzler
BY
His Attorney

July 12, 1960
L. R. HETZLER
2,945,174
TRANSISTOR REGULATOR
Filed Jan. 6, 1958
3 Sheets-Sheet 2
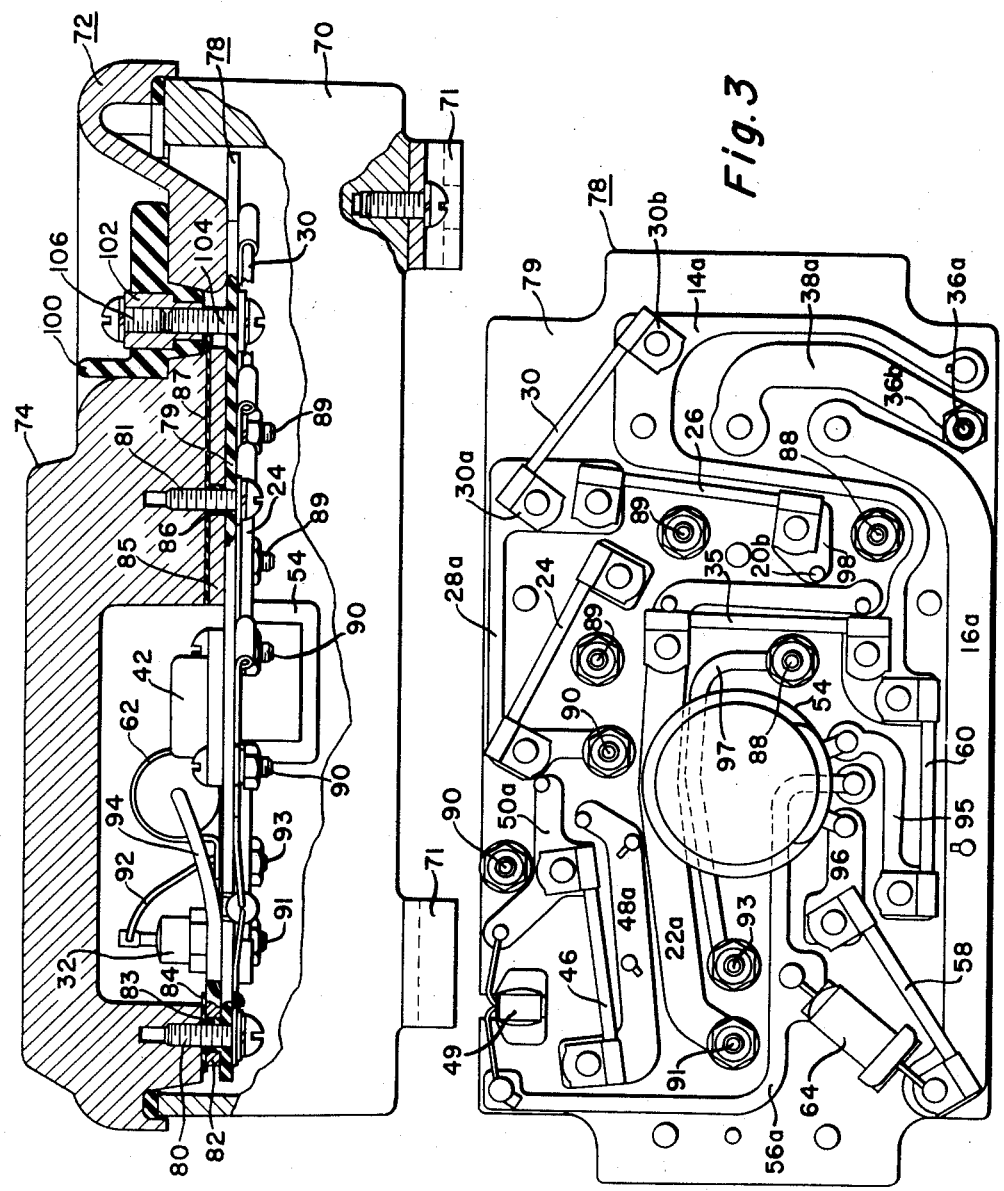
INVENTOR.
Lewis R. Hetzler
BY
His Attorney

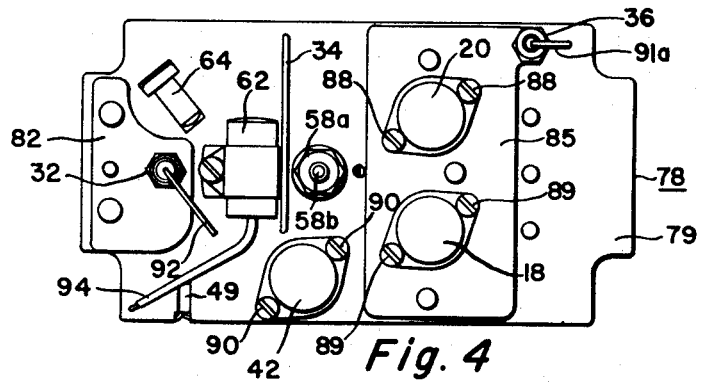
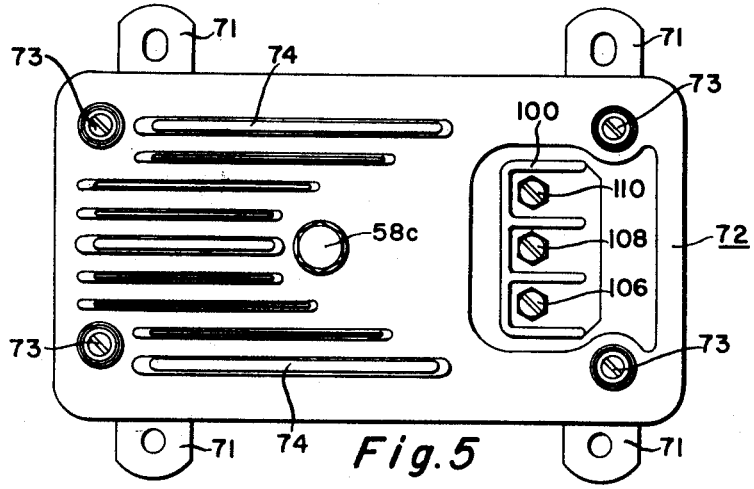
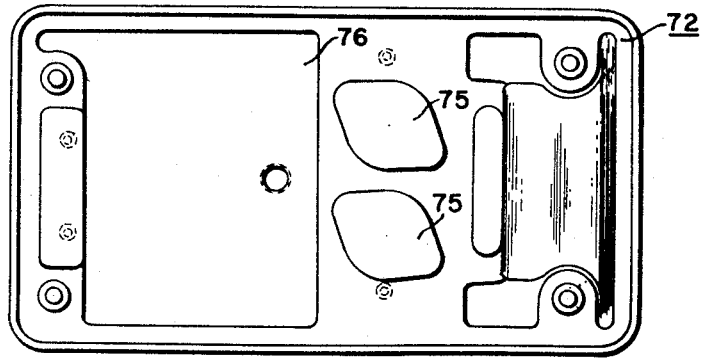

United States Patent Office

2,945,174
Patented July 12, 1960

2,945,174

TRANSISTOR REGULATOR

Lewis R. Hetzler, Anderson, Ind., assignor to General Motors Corporation, Detroit, Mich., a corporation of Delaware Filed Jan. 6, 1958, Ser. No. 707,200

5 Claims. (Cl. 323—22)

This invention relates to voltage regulators, and more particularly to voltage regulators wherein one or more transistors are used to control the current flow through the control winding of a power source. A regulator of the type described could be used with D.C. machines, straight A.C. machines with D.C. excitation, or A.C. machines with rectified D.C. output.

It is an object of this invention to provide a voltage regulator circuit wherein a transistor or transistors is connected in circuit with a control winding of a power source and wherein the transistor or transistors are rendered substantially either fully nonconductive or fully conductive in response to voltage fluctuations of the power source, so as to provide for minimum heat loss in the transistor or transistors. The circuit for rendering the transistor either fully conductive or fully nonconductive includes a circuit element that has a substantially constant voltage drop thereacross with varying current therethrough, thus permitting the use of smaller biasing resistors in the transistor circuit to reduce the heating effect of the biasing resistors and thus reduce the overall heat generation of the regulator.

The circuit element described above preferably takes the form of a silicon diode that is connected in series with the controlling transistor or transistors and in series with the control winding of the direct-current power source. With such an element the voltage drop across it is adequate for biasing purposes during periods of nonconduction by the transistors, while during periods of conduction the voltage drop across and the heat produced in the element is less than in prior regulator circuits.

It is another object of this invention to provide a regulator circuit for a direct-current power source having a control winding wherein a pair of parallel-connected transistors are connected in series with the control winding of the D.C. power source and wherein the series-connected paralleled transistors and control winding are connected across the output terminals of the D.C. power source, the conduction of the transistors being controlled in response to voltage variation appearing across the output terminals. A pair of equalizing resistors are preferably connected in the base circuit of the paralleled transistors to insure equalization of current flow through the transistors and thus insure equal division of control winding current through the transistors.

Another object of this invention is to provide a compact mounting arrangement for the component parts of a transistor regulator circuit. This object is accomplished in part by connecting certain of the component parts of the regulator together by means of a printed circuit board which also serves to support certain of the component parts.

A further object of this invention is to provide a transistor regulator wherein certain of the transistors of the regulator are mounted in heat transfer relationship with a heat sink member that conducts heat away from the transistors.

From the foregoing, it is apparent that this invention contemplates providing a transistor voltage regulator wherein the heat losses of the component parts of the regulator are reduced to a minimum and wherein the voltage drops in the regulator components that are in series with the control winding of the source are reduced to a minimum. Because of the efficient operation of the regulator of the invention, it is ideally suited for controlling the generator of a motor vehicle that is driven at widely-varying speeds and wherein only relatively-low voltages are available.

Further objects and advantages of the present invention will be apparent from the following description, reference being had to the accompanying drawings wherein a preferred embodiment of the present invention is clearly shown.

In the drawings:

Fig. 2 is a side view with parts broken away of voltage regulator made in accordance with this invention and illustrating the physical construction of the circuit shown in Fig. 1.

Fig. 3 is a plan view of one side of a panel assembly that forms a component part of the regulator illustrated in Fig. 2.

Fig. 4 is a plan view on a reduced scale of the opposite side of the panel illustrated in Fig. 3 from the side shown in Fig. 3.

Fig. 5 is a top view on a reduced scale of the regulator shown in Fig. 2.

Fig. 6 is a plan view on a reduced scale of the underside of the cover member of the regulator illustrated in Fig. 2.

Figure 1:
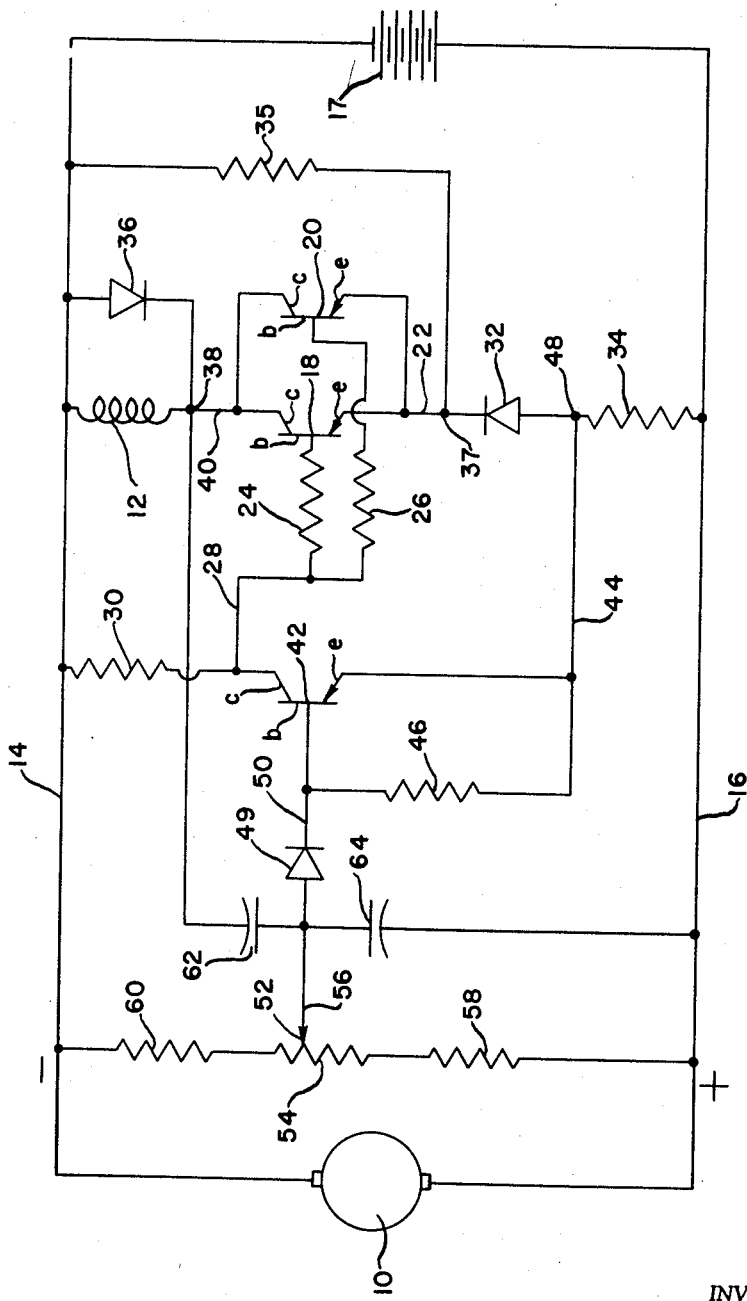
Fig. 1 is a circuit diagram of a voltage regulator circuit made in accordance with this invention.

The regulator circuit to be described is an improvement over the regulator circuit shown in copending application Ser. No. 621,833, filed Nov. 13, 1956.

Referring now to the drawing, a direct-current generator having an armature 10 and a shunt field winding 12 is shown. The output terminals of the armature are connected with output leads 14 and 16 which form a two-terminal D.C. output circuit that feeds a storage battery 17 and other loads (not shown). The circuit to be described is not limited for use with a direct-current generator and will work equally as well with an A.C. generator that is provided with suitable rectifiers, and is useful in A.C. generators having D.C. excitation. Where an A.C. generator and rectifiers are used, the output terminals of the rectifier or rectifiers are connected with leads 14 and 16 and the field winding of the A.C. generator is connected in the circuit in a manner identical with the connection of field winding 12 in the circuit shown. In the circuit illustrated, the armature 10 is adapted to be driven by the engine of a motor vehicle (not shown) and where an A.C. generator is used the rotor of the generator is driven by the engine of a motor vehicle.

One side of the field winding 12 is connected directly to lead 14 while the other side of the field winding is connected to the collectors c of parallel-connected transistors 18 and 20. The emitters e of transistors 18 and 20 are connected together and to a lead 22. The bases b of transistors 18 and 20 are connected respectively with equalizing resistors 24 and 26 which have the same resistance value. The opposite sides of the resistors 24 and 26 are connected together and to a lead 28. The equalizing resistors insure an equal division of base current flow through the transistors in the event the voltages appearing across the base and emitter of the transistors become unequal.

The lead 28 that is connected with resistors 24 and 26 is connected to one side of a resistor 30 that has its other side connected directly to lead 14. The lead 22 that is connected with the emitters of transistors 18 and 20 is connected to one side of a silicon diode 32 that is in turn connected to one side of a feedback resistor 34 that has its opposite side connected directly to output lead 16. A diode 36 has one side connected to output lead 14 and has its other side connected to junction 38 that is connected to a lead 40 that connects one side of field winding 12 with the collectors of transistors 18 and 20. The diode 36 operates to dampen voltage surges appearing across field winding 12. A resistor 35 is connected between junction 37 and output line 14.

The silicon diode 32 has the characteristic of having a substantially constant voltage drop thereacross with variation of current flow therethrough in a forward direction. By employing this peculiar characteristic of a silicon diode, it is possible to greatly reduce the heating effect of certain of the circuit elements of the regulator as will become more readily apparent hereinafter.

The regulator circuit illustrated is designed to control the current in field winding 12 and thus regulate the output voltage of armature 10, by varying the conductivity of paralleled transistors 18 and 20. The transistors 18 and 20 by the circuit illustrated are either operated substantially fully nonconductive or fully conductive. This mode of operation is used because it has been found that the heating effect of transistors 18 and 20 may be reduced to a minimum by operating them either fully non-conductive or fully conductive. Since the emitter-to-collector currents of transistors 18 and 20 depend upon the emitter-to-base currents of these transistors, it will be apparent that the conduction of these transistors may be controlled by controlling their base currents. In this connection, it should be noted that resistors 24, 26 and 30 are chosen to have values that will provide a sufficient base current in transistors 18 and 20 to provide maximum collector current in these transistors. This base current flows from emitter to base in the transistors and thence respectively through resistors 24 and 26 and through resistor 30 to line 14.

The conduction of transistors 18 and 20 is controlled by a transistor 42 having a base $b$, an emitter $e$, and a collector $c$. The collector $c$ of transistor 42 is connected to one side of resistor 30 while the emitter $e$ of transistor 42 is connected to a lead 44 which is, in turn, connected to one side of a resistor 46 and to junction 48 located between silicon diode 32 and resistor 34. The base $b$ of transistor 42 is connected to one side of a Zener diode 49 by a lead 50 that is also connected to one side of resistor 46. The Zener diode has the characteristic of preventing current flow therethrough in a reverse direction until a predetermined voltage is applied thereacross, whereupon the diode breaks down to permit current flow in a reverse direction. The opposite side of Zener diode 49 is connected to an adjustable tap 52 on a resistor 54 by means of a lead 56. The resistor 54, together with resistors 58 and 60, form a series-connected voltage divider network that is connected directly across output leads 14 and 16. A condenser 62 is connected between lead 56 and junction 38 and another condenser 64 is connected between lead 56 and output lead 16.

As noted hereinbefore, the conduction of transistor 42 from emitter to collector controls the conduction of transistors 18 and 20. This action is due to the fact that the transistor 42 operates as a variable resistance which shunts current around the emitter-to-base path of transistors 18 and 20. As this shunting action varies, the emitter-to-base currents of transistors 18 and 20 are changed from maximum to essentially zero, and this action results in changing the emitter-to-collector currents of transistors 18 and 20 from a maximum to essentially zero. Of course the magnitude of base current change in transistor 42 is much less than the magnitude of field current change due to the amplification of the two-stage transistor amplifier.

Connected across output leads 14 and 16 is a voltage divider network comprised of resistors 58, 54 and 60. A voltage sensing loop consisting of Zener diode 49, base-to-emitter circuit of transistor 42 as shunted by resistor 46, and feedback resistor 34 has applied to it that portion of line voltage across resistor 58 and resistor 54 up to tap 52. Resistance values of 58, 54 and 60 are chosen so that the voltage sensed by the loop is of the order of magnitude of the breakdown of the Zener diode when voltage across leads 14 and 16 is at the desired level. Changes in voltage across leads 14 and 16 produce similar changes in voltage across diode 49. Since the conductivity of the diode is influenced by the voltage across it, as previously indicated, the emitter-to-base current of transistor 42 and consequently the emitter-to-collector current of transistor 42 depend on these voltage changes.

When the voltage across leads 14 and 16 is below the desired level, no current flows in the sensing loop, transistor 42 is nonconducting and full field current is supplied through paralleled transistors 18 and 20. When line voltage exceeds the desired value, diode 49 becomes conductive permitting emitter-to-base current in transistor 42 and therefore emitter-to-collector current in transistor 42. This shunts off almost all the base currents in transistors 18 and 20, and the collector currents in 18 and 20 which make up the current in the generator field are reduced to practically zero. The transistors 18 and 20 are therefore operated either fully conductive or fully nonconductive, this mode of operation being due primarily to the particular connection of diode 32 and resistor 34 with the remainder of the regulator circuit. The action of the silicon diode will be described first.

The silicon diode, which has a substantially constant voltage thereacross with varying current therethrough, is connected in series with both resistor 35 and transistors 18 and 20. When transistors 18 and 20 are nonconductive, the resistor 35 provides a current path for current flow between leads 14 and 16 and through silicon diode 32. With current passing through diode 32, a voltage drop is developed thereacross which is of a magnitude to equal or slightly exceed the minimum voltage across emitter to collector of transistor 42. With transistor 42 conducting, this voltage developed across the diode tends to completely shut off transistors 18 and 20 as the potential of the bases of transistors 18 and 20 approaches or exceeds the potential of the emitters of transistors 18 and 20 to cut off the base current of these transistors. With the base current cut off in transistors 18 and 20, the collector current is likewise reduced to substantially zero to render the transistors 18 and 20 substantially nonconductive.

It is of particular importance that the circuit element 32, which is a silicon diode in this case, have a substantially constant voltage thereacross with change in current flow therethrough. Since the full field current for the generator must pass through circuit element 32, it is necessary to keep its resistance quite low so that the voltage drop thereacross will not become excessive. If a resistor is used as circuit element 32, resistor 35 must conduct considerable current to develop enough bias voltage across element 32 when transistors 18 and 20 are nonconducting. With such an arrangement, resistors 32 and 35 become sources of considerable heat.

By employing the unique voltage drop properties of a silicon junction rectifier, this heating can be greatly reduced. In the direction of normal conduction, the forward direction, the voltage drop across the silicon diode remains substantially the same from very small currents to large currents. With the use of diode 32, resistor 35 need only conduct a very small current to develop an adequate bias voltage across the diode when transistors 18 and 20 are nonconducting. On the other hand, when full current is being passed to the field 12 by transistors 18 and 20, the voltage drop across diode 32 does not become excessive. The circuit thus has two important advantages; the reduction in size and heating effect of resistor 35, and reduced voltage drop in the field circuit during conduction of field current.

The feedback resistor 34 is a part of the previously referred to voltage sensing loop which senses the voltage appearing across resistor 58 and the lower portion of resistor 54.

To analyze the circuit operation, assume that the generated voltage is high and hence the field current will be cut off to essentially zero. For this reason the voltage across resistor 34 is essentially zero. Since the voltage across leads 14 and 16 is high, Zener diode 49 will permit a large control current to pass through the emitter-to-base circuit of transistor 42. With the field current at zero, the regulated voltage will start to drop and through the normal control action previously described, the field current will begin to increase. When the field current begins to increase, the voltage drop across the feedback resistor 34 will also start to increase. This feedback voltage is connected into the voltage sensing loop in such a manner that it subtracts from the sensed voltage, giving an indication that the voltage is dropping faster than it actually is. This will call for more field current and the process continues until the field current cannot increase further due to the resistance of the field.

Assuming that the generator capacity is adequate, the regulated voltage will start to rise with full field applied. When the regulated voltage has increased to a point where the sensed voltage less the feedback voltage will result in the proper control current through the voltage diode 49, the field current will being to be reduced. The action is now reversed in that the voltage across resistor 34 will drop so that less voltage is subtracted from the sensed voltage resulting in further lowering of field current, and so on until the field current is driven to zero. The action of switching the field current on and off is extremely fast, and, therefore, no appreciable time is spent in the one-half or intermediate current range where the transistor might heat. To further insure that this is the case, the capacitor 62 is used to feed back a transient voltage into the sensing circuit during switching to accelerate the action. The capacitor 64, which is connected between line 56 and lead 16, is intended to smooth the sensed voltage so that only D.C. appears across the transistor input.

Referring now more particularly to Figs. 2 through 6 a preferred physical embodiment of the regulator circuit shown in Fig. 1 is illustrated. The same reference numerals have been used in all the figures to identify identical or equivalent parts. It is to be understood that the physical structure shown in Figs. 2 through 6 does not include the power source 10, its control winding 12, or the battery 17 as they are not a part of the regulator.

The regulator structure comprises a base 70 that is formed of suitable metal material such as die-cast aluminum and which carries a plurality of mounting brackets 71. A cover member generally designated by reference numeral 72 is fastened to the base 70 by suitable threaded fastener members 73. The cover member is formed of suitable heat conducting material, such as die-cast aluminum, and has integrally-formed heat-conducting fins designated as a whole by reference numeral 74. These fins conduct heat away from the cover member 72 and away from the heat-generating parts of the regulator. The cover member as is best illustrated in Fig. 6 is formed with a pair of pockets 75 that fit over transistors 18 and 20 when the cover is in place on the base. The cover member also has a recessed area 76 that encloses certain parts of the regulator when the cover member is in place on the base.

The cover member 72 carries a panel assembly generally designated by reference numeral 78. The panel assembly includes a sheet or board of suitable electrical insulating material 79 that carries a printed circuit and various other component parts of the regulator as will become more readily apparent hereinafter. The panel assembly 78 is held to cover member 72 by screws 80 and 81. The screws 80 pass through a metal heat sink member 82 that is formed of a heat-conducting metal such as aluminum. These screws are electrically insulated from heat sink member 82 by an insulator bushing 83 formed of suitable electrical insulating material. The cover member 72 is also electrically insulated from heat sink member by a sheet of insulating material 84. The screws 81 pass through a second metal heat sink member 85 that is formed of copper or the like. This heat sink member is electrically insulated from screws 81 by insulating material 86 and is electrically insulated from heat sink member 85 by a sheet of insulating material 87.

Referring now more particularly to Fig. 4, it is seen that the top side of panel board 78 carries various components of the circuit shown in Fig. 1. The power transistors 18 and 20 rest on the heat sink member 85 and are held thereon by screws 88 and 89 which are threaded into suitable nuts as shown in Fig. 3. The transistors 18 and 20 are of the conventional P–N–P type having a metal heat conducting base that is in contact with heat sink 85 so that heat generated at the junction of the transistor is transferred to heat sink 85. The metal base and case of the transistors is the collector electrode of the transistors and these electrodes are connected together by heat sink 85. The collectors of transistors 18 and 20 are thus connected together as is shown in Fig. 1.

The heat sink 85 is electrically and thermally connected to one side of the silicon diode 36 that has a stud 36a that passes through the heat sink member and which and which is held to conductor strip 38a by a nut 36b. This stud forms one terminal side of the diode 36 while the other side of the diode is connected with a lead 91a that connects with conductor strip 14a of a printed circuit formed on the underside of board 79. The diode 36 is thus electrically and thermally connected with heat sink 85 and the heat generated by the diode is transferred to the heat sink.

The board 79 carries the transistor 42 that controls the conduction of power transistors 18 and 20. This transistor is secured to panel 79 by screws 90 that are threaded into suitable nuts as shown in Fig. 3. The metal case of transistor 42 is the collector electrode of the transistor and is thus connected to the screws 90. The base and emitter electrodes of transistor 42 (not shown) pass through the panel 79 and are connected to certain portions of the printed circuit located on the underside of the panel.

The heat sink member 82 carries the silicon diode 32. This diode has a threaded stud 91 that passes through heat sink 82 and board 79 and which is held in place by a nut as shown in Fig. 3. The stud is one terminal side of the diode and is connected to a part of the printed circuit on the underside of panel 79. The opposite side of diode 32 is connected by a wire 92 to the printed circuit. The diode 32 is thus connected in thermal exchange relationship with the heat sink 82 and the heat generated by the junction of the diode is conducted to heat sink 82.

The panel 79 also carries Zener diode 49, condensers 62 and 64, and variable resistor or potentiometer 54. The condenser 62 is held in place by a screw or bolt 93 that also forms one terminal connection of the condenser. The other terminal side of the condenser is formed by a lead wire 94. The panel board also supports the resistor 34 that takes the form of a length of resistance wire.

The underside of panel or board 79 as is shown in Fig. 3 is formed as a printed circuit. This printed circuit includes the flat metal conductor strips 14a, 16a, 22a, 28a, 38a, 48a, 50a, and 56a that are cemented or otherwise secured to the panel board. These conductor strips correspond respectively to leads 14, 16, 22 and 28, terminals 38 and 48, and leads 50 and 52 shown in Fig. 1. The conductor strips 95, 96 and 97 are likewise cemented or otherwise secured to panel 79.

The resistor 30 has terminal ends 30a and 30b that are soldered respectively to conductor strips 28a and 14a. This resistor is of the wire-wound type but may be of other types well known to those skilled in the art. In a like manner, one side of resistor 26 is connected to conductor strip 28a. The opposite side of resistor 26 is connected to a conductor strip 98 that is, in turn, connected with the base electrode 20b of transistor 20. This electrode passes downwardly from transistor 20 through suitable openings (not shown) formed in heat sink 85 and panel 79. The emitter electrode of transistor 20 in a like manner is connected with conductor strip 22a. The base and emitter electrodes of transistor 18 also pass downwardly through heat sink 85 and panel 79 and are connected respectively with one side of resistor 24 and to conductor strip 22a. These connections are all made by a soldering operation as is indicated by the dots in Fig. 3.

The greater portion of the remainder of the circuit connections on the underside of panel 79 are also made by a soldering operation as described above. Thus, resistor 24 is connected between conductor strip 28a and the base of transistor 20, resistor 46 between conductor strips 48a and 50a, resistor 58 between conductor strips 16a and 96, resistor 60 between conductor strips 14a and 95, and resistor 35 between conductor strips 14a and 22a. The Zener diode 49 is connected between conductor strips 50a and 56a, as shown, while condenser 64 is connected between conductor strips 16a and 56a. The bolt 93 that forms one side of condenser 62 is connected to conductor strip 97 while the terminal 94 of this condenser passes through panel 79 and is soldered to conductor strip 56a. The collector electrode of transistor 42, which is the case of the transistor, is connected by one of the bolts 90 and the conductor strip 28a. The base and emitter electrodes of transistor 42 pass through panel 79 and are connected respectively with conductor strips 50a and 48a by a soldering operation. The terminals of variable resistor 54 are connected with conductor strips 56a, 95 and 96. This resistor has a threaded shank that passes through board 79 and which is engaged by a nut 58a. The resistor has an adjusting shaft 58b which may be adjusted by rotation of nut 58c rotatably mounted in cover member 72. This nut preferably has a shaft (not shown) that has a detachable connection with shaft 58b. The rotation of shaft 58b adjusts the resistance value of resistor 54. The resistor 34 has ends that project through panel 79 and which are connected respectively to conductor strips 48a and 16a.

The cover member 72 is fitted with an insulator block 100. The insulator block has three openings which respectively recive a brass insert member 102 that is threaded internally. These brass inserts are connected respectively with conductor strips 14a, 16a and 38a by means of screws 104. These screws serve to make an electrical connection between the brass inserts and the conductor strips and also serve to hold the brass insert and insulator block in place on cover member 72. The brass inserts are respectively provided with screws 106, 108 and 110, that are threaded into the top end of the inserts. These screws are used to connect the regulator with a power source and the control winding of the power source. The terminal 106 is a negative terminal, the terminal 108 a field terminal, and the terminal 110 is the positive terminal.

From the foregoing it will be apparent that the applicant has provided a very compact transistor regulator that is not likely to get out of order. The transistors and other circuit elements are operated relatively cool, due to the design of the circuit of Fig. 1 and due to the provision of heat sinks and a finned housing for the regulator. It will be appreciated that the heat sinks and finned housing provide for conduction of heat away from the regulator to the surrounding atmosphere it is operating in.

While the embodiments of the present invention as herein disclosed constitute preferred forms, it is to be understood that other forms might be adopted.

What is claimed is as follows:

1. A regulator structure comprising, a base member, a cover member attached to said base member, an insulator board supported by said cover member having a printed circuit on one side thereof, a heat sink member mounted on an opposite side of said insulator board, and a transistor mounted on said heat sink member in thermal exchange relationship therewith, said transistor having at least one electrode passing through said heat sink and board and connected with said printed circuit.

2. A transistor regulator comprising, a metal base member, a metal cover member removably secured to said base member, said cover member having integrally formed heat radiating fins, a panel assembly including an insulator board having a printed circuit on one side thereof secured to said cover member, a metal heat sink member mounted on an opposite side of said insulator board, and a transistor mounted on said heat sink member in thermal exchange relationship therewith, said transistor having at least one electrode passing through said heat sink member and board and connected with said printed circuit.

3. A regulator comprising, a metal base member, a metal cover member removably secured to said base member and having integrally formed fins, an insulator board having a printed circuit on one side thereof, a metal heat sink member on the opposite side of said board, a transistor resting on said heat sink member, a fastener for holding said transistor, board and heat sink member in fixed relationship with one another, said transistor having at least one electrode extending through said heat sink member and board and connected with said printed circuit, and fastener means for securing said board to said cover member with at least a portion of said heat sink member being in good thermal exchange relationship with said cover member.

4. A panel assembly for electrical apparatus comprising, an insulator board, a printed circuit on one side of said board, a metal heat sink member attached to the opposite side of said board, and a transistor resting on said heat sink member and secured thereto, said transistor having at least one electrode extending through said board and heat sink member and connected with said printed circuit.

5. A panel assembly for electrical apparatus comprising, an insulator board, a printed circuit on one side of said insulator board, a metal heat sink member mounted on an opposite side of said insulator board, and a pair of transistors mounted on said heat sink member each having a collector connected to said heat sink members, said transistors each having a base and an emitter connector that passes through said board and heat sink member and which is connected with said printed circuit.

References Cited in the file of this patent

UNITED STATES PATENTS

| 2,760,123 | Wills | Aug. 21, 1956 |
| 2,767,353 | Kingdom | Oct. 16, 1956 |
| 2,809,301 | Short | Oct. 15, 1957 |
| 2,832,900 | Ford | Apr. 29, 1958 |